Sept. 13, 1966  R. F. HERZOG ETAL  3,272,984
ELECTRON MULTIPLIER FOR MEASURING THE
FLOW OF POSITIVELY CHARGED PARTICLES Filed June 7, 1963  3 Sheets-Sheet 1

INVENTORS
RICHARD F. HERZOG
GERHARD O. SAUERMANN
WILLIAM J. McMAHON
BY Kenway, Jenney & Hildreth
ATTORNEYS

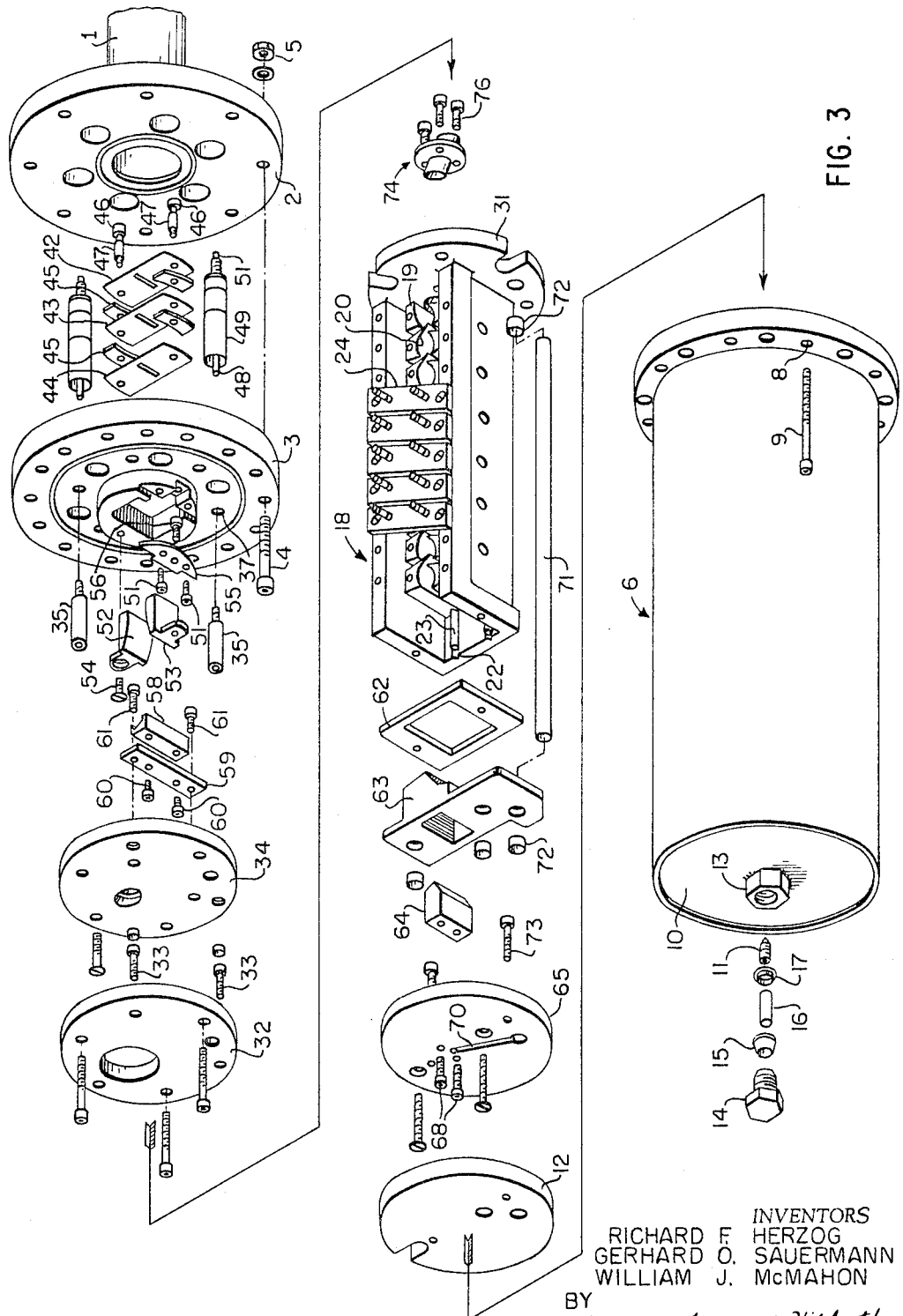

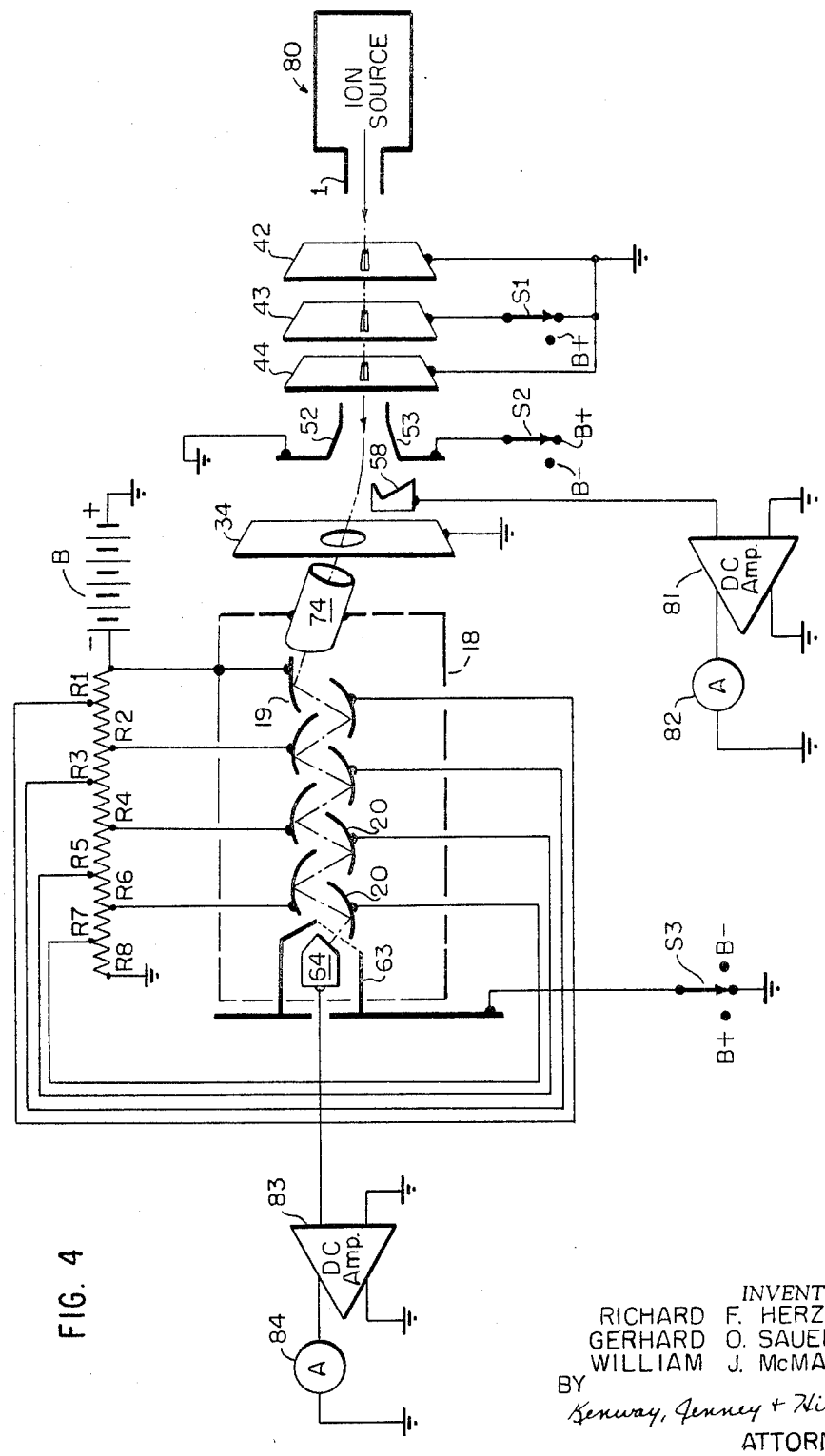

United States Patent Office 3,272,984
Patented Sept. 13, 1966

3,272,984
ELECTRON MULTIPLIER FOR MEASURING THE FLOW OF POSITIVELY CHARGED PARTICLES
Richard F. Herzog, Lexington, Gerhard O. Sauermann, Burlington, and William J. McMahon, Watertown, Mass., assignors to GCA Corporation, Bedford, Mass., a corporation of Delaware
Filed June 7, 1963, Ser. No. 286,264
13 Claims. (Cl. 250—83)

This invention relates to electron multipliers, and particularly to a novel secondary electron multiplier of simple and rugged construction and capable of improved performance.

The need for accurate detection and measurement of charged particles such as ions in evacuated systems such as high resolution mass spectrometers, leak detectors, vacuum ultraviolet spectrographs, and the like, has prompted concerted efforts toward the development and improvement of secondary electron multipliers. In general, such a multiplier comprises a cascade series of electrodes, commonly termed dynodes, having shaped working faces possessing relatively high secondary electron emission coefficients. The first of these dynodes is placed in the path of an ion beam and charged to a high negative potential. Positively charged ions striking this dynode cause the emission of secondary electrons. The remaining dynodes are maintained at successively more positive potentials, and are placed in a stepwise array so that the stream of secondary electrons from the first dynode is progressively enhanced by secondary electrons emitted from each dynode in the series as the multiplied stream is accelerated from one dynode to the next. A collector is placed to receive the stream of electrons from the last dynode in the series, and means are provided for measuring current flow to this collector. Numerous electron multipliers have been devised incorporating these basic elements. For example, in one form of prior multiplier, the dynodes were made from thin sheet metal, and were suspended by ceramic plates to form a subassembly mounted in a glass envelope by means of small rods or ceramic spacers. A simple and inexpensive arrangement resulted; however, this form of construction is easily damaged by mechanical shock and vibration, and is unsuited to environments such as those encountered in rockets, satellites, space vehicles, and the like, or in industrial applications where heavy vibration is encountered. Another prior construction involved the mounting of the dynodes on individual metal plates spaced between glass rings. The outer rims of the plates and rings were sealed together to form a vacuum housing. Such a construction is rugged, but is not well suited for attachment to an existing vacuum system. In addition, erosion of the dynodes in such units, resulting from normal use, would necessitate the replacement of the entire multiplier assembly.

The principal objects of our invention are to improve the performance of electron multipliers, to improve their stability, to facilitate their adjustment and repair, and to make possible the use of an electron multiplier under extreme environmental conditions of shock and vibration.

Basically, an electron multiplier in accordance with our invention comprises a series of relatively massive metal dynodes compactly secured in position for operation in a metal housing which is maintained at the potential of the first dynode in the series. This housing is rigidly mounted within a soft steel vacuum enclosure, which efficiently shields the multiplier from the effects of electromagnetic fields external to the housing. The electron collector is mounted at the end of the metal dynode housing within, but insulated from, a metal collector shield. Means are provided for applying selected potentials to this shield to vary the output of the collector, in a manner which will be made apparent hereinafter, to adapt the electron multiplier for use with a variety of output indicators or control systems.

At the entrance of the dynode housing in the electron multiplier of our invention, we prefer to mount a shielding tube maintained at the potential of the housing. A plate, maintained at ground potential and having an aperture cooperating with the tube, is mounted within the vacuum enclosure adjacent the tube to form an ion lens with the tube for focusing a beam of ions on the first dynode. Deflector electrodes are provided for directing a beam of ions entering the housing, either through this lens into the dynode housing, or onto a collector mounted in the vacuum enclosure and adapted to be connected to apparatus for measuring the flow of current from it in response to impingement of the primary ion beam entering the enclosure. This measurement is useful for computing the gain of the multiplier, as well as for evaluating its performance from time to time.

The vacuum housing of the electron multiplier of our invention is adapted to be connected to any desired vacuum system, and is provided at the entrance end with a series of electrodes having slits for confining entering ions to a desired beam shape. Preferably, means are also provided for at times applying a potential to one of these electrodes to suppress the flow of ions into the housing.

Our invention will best be understood with reference to the accompanying drawings, together with the following detailed description, of a preferred embodiment thereof.

In the drawings:

FIG. 3 is an exploded sketch of the apparatus of FIGS. 1 and 2; and

FIG. 4 is a schematic wiring diagram showing the apparatus of FIGS. 1, 2 and 3 connected to form an ion measuring system.

Figure 1:
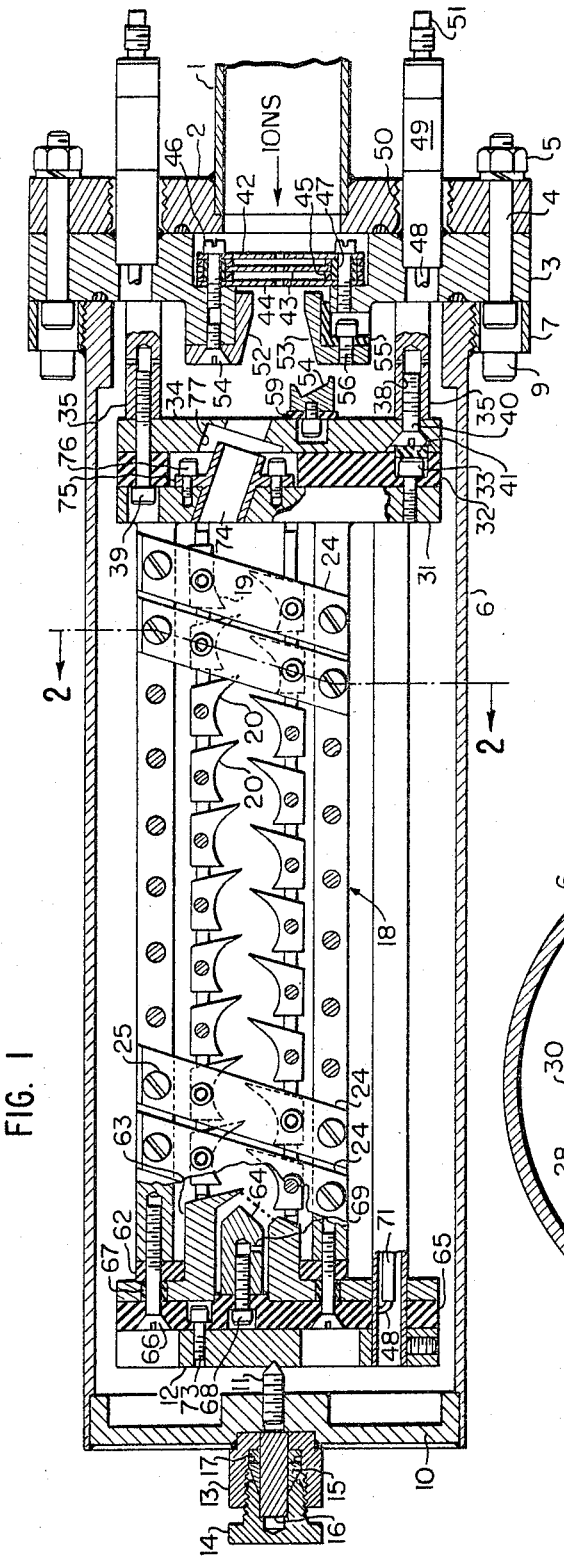
FIG. 1 is an elevational view, with parts shown in cross-section and parts broken away, of an electron multiplier in accordance with a preferred embodiment of our invention.
Figure 2:
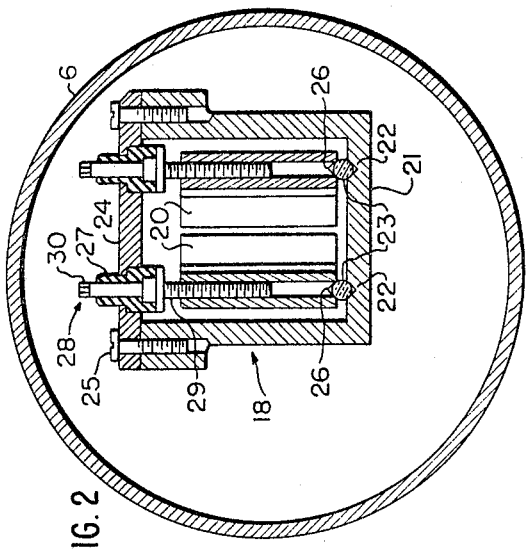
FIG. 2 is a cross-sectional view of the apparatus of FIG. 1, taken essentially along the lines 2—2 in FIG. 1, with parts removed to simplify the illustration of the parts shown.

Referring first to FIGS. 1, 2 and 3, we have shown an electron multiplier provided with an input tube 1 adapted to be connected to any suitable source of ions, not shown, such as an evacuated mass spectrograph or the like. The tube 1 is welded or otherwise sealed and secured to a lower flange 2, made of any suitable metal such as nickel-plated copper or the like, to which a base flange 3, which may also be of nickel-plated copper, is detachably secured by suitable means such as the bolts 4 and nuts 5 shown.

The base flange 3 serves as a mounting plate and support for the electron multiplier assembly of our invention. This assembly comprises a vacuum housing 6, preferably made of ferromagnetic material, such as soft steel, to act as a magnetic shield. A mounting flange 7 is secured to one end of the vacuum housing 6, as by the threads shown in FIG. 1, and the flange 7 is provided with suitable apertures such as 8 to receive mounting bolts such as 9 for securing the vacuum housing to the base flange 3. The other end of the vacuum housing 6 is closed by a plate 10, which may also be of soft steel and may be welded or otherwise secured to the housing 6.

As best shown in FIGS. 1 and 3, a central aperture in the plate 10 is threaded to receive a set screw 11 which cooperates with a central recess in an end plate 12 of the dynode housing, to be described, to provide added mechanical support for the dynode housing. A nut 13 is formed with a protruding end inserted in a recess formed in the end plate 10 as shown in FIG. 1, and the nut is there secured and sealed in any suitable manner, as by welding or the like. This nut 13 is adapted to receive a conventional vacuum seal for the aperture in which the set screw is threaded, which need not be described in detail except to point out that it comprises an end cap 14 provided with threads engaging cooperating threads in the nut 13 to expand a flexible sealing gasket 15 into sealing engagement with the nut 13. The sealing gasket 15 may be further confined and directed by an inner sleeve 16 and a collar 17, in a manner well known in the art.

The electrical elements of the electron multiplier of our invention are confined by or supported on a dynode housing generally designated by 18. Within this housing, a first dynode 19 is mounted. The dynode 19 serves to receive an ion beam and responds by the production of secondary electron emission, which is multiplied by a series of following dynodes 20 which respond to impinging electrons to release a greater number of secondary electrons. The dynodes 19 and 20 may be made of any suitable material having a high coefficient of secondary electron emission, such as beryllium-copper or silver-magnesium or aluminum-magnesium or the like. As best shown in FIG. 2, the dynode housing 18 comprises a metal channel 21, of aluminum or the like, which is provided with a pair of longitudinal triangular grooves 22. An insulating rod 23, of ceramic material or the like, is supported in each of the grooves 22 as shown in FIGS. 2 and 3. Top plates 24 are mounted across the open side of the channel 21 by suitable means such as the screws 25. The top plates 24 and screws 25 may also be made of aluminum or the like. The dynodes 19 and 20 are rigidly mounted between the bottom of the channel 21 and the top plates 24, by novel means next to be described which serve to support them rigidly and also to provide for electrical connections to the dynodes.

As shown in FIG. 2, each of the dynodes 20 is provided with a triangular groove such as 26 at its lower end to register with one of the ceramic rods 23. The dynodes are each suspended between one of these rods 23 and a ceramic insulating bushing 27 mounted in the top plate 24 by means of a stainless steel stud generally indicated at 28. Each stud 28 is provided at its lower end 29 with threads cooperating with mating threads in the associated dynode, so that a stud 28 can be advanced, as by a wrench applied to its hexagonal head 30, to thrust each dynode 20 firmly into engagement with one of the ceramic rods 23 against the resistance offered by the ceramic insulator bushing 27. The protruding end 30 of each stud 28 may then be used as an electrical lead for making connection to the dynode. As will appear, the dynodes are interconnected by a potential divider comprising resistors, not shown, which are connected between the terminals formed by the studs 30 to make it possible to apply successively different potentials to the first dynode 19 and to the remaining dynodes 20. For convenience, the first dynode 19 may be mounted in the same way as the succeeding dynodes 20, but it is desired that this dynode 19 be electrically connected to the channel 21. One simple means for providing such a connection would be to replace the insulating bushing 27 by an aluminum bushing for this dynode; alternatively, an external connection may be provided.

The dynode housing 18 may be provided at its entrance end with a mounting flange 31 formed integral with the channel 21, as by casting of the flange and channel in a single block. The flange 31 is secured to an intermediate insulating flange 32, by suitable means such as the screws 33. The flange 32 may be made of any suitable insulating material such as plastic, ceramic, or the like.

The insulating flange 32 is bolted to a mounting flange 34, of nickel-plated copper or the like. The mounting flange 34 is spaced away from and secured to the base flange 3 by stainless steel riser studs 35, which are provided at one end with reduced threaded projections such as 36 to cooperate with threaded apertures 37 in the base flange 3, and are provided at their other ends with threaded apertures 38, as shown in FIG. 1, to receive mounting screws. Where convenient, the latter may comprise bolts such as 39 extending both through the insulating flange 32 and the mounting flange 34. However, where the desired location of the mounting screws 33 would interfere, screws such as 40 are countersunk into the mounting flange 34 and are separated from the screws 32 electrically by insulating spacers 41.

Beginning at the entrance end of the apparatus defined by the tube 1, ions entering the apparatus first encounter a slit defined by three spaced electrodes 42, 43 and 44. These electrodes are separated by insulating spacers such as 45, which may be made of any suitable insulator such as ceramic material or the like, and are secured together and to the base flange 3 by suitable means such as the bolts 46. As shown in FIGS. 1 and 3, the electrodes 42 and 44 are electrically connected to the base flange by means of these bolts 46. However, insulating spacers 47 are provided to insulate the electrode 43. Thus, it is possible to apply a different potential to this electrode so that it can function as a suppressor grid for varying or cutting off the current of ions to the apparatus. External connections to this electrode, as well as to the other electrical terminals in the multiplier, may be made by means of insulating feed-through connectors of conventional construction, which are schematically shown in FIG. 1 as comprising a central conductor such as 48 insulated by a ceramic shield 49 secured in and sealed to the base flange 3. An external terminal for the lead 48 is formed as shown at 51. By this arrangement, different potentials may be applied to the internal structure of the multiplier without interfering with the vacuum seal.

In order to control the direction of flow of ions through the slits defined by the electrodes 42, 43 and 44, a pair of deflector electrodes 52 and 53 are secured to the base flange 3 within the slit. The deflector electrode 52 may simply be secured to the base flange 3, and electrically connected thereto, by a metal screw 54. However, since it is desired to control the potential of the electrode 53, for reasons which will be made clear below, it is insulated from the base flange 3 by an insulator plate 55, to which it is secured by suitable means such as the screw 56, as best shown in FIG. 3. The insulating plate 55 is in turn secured to the base flange 3 by screws 57 which do not contact the electrode 53, the base flange 3 being recessed to provide for the insulated mounting of the electrode 53 in this manner as shown in FIG. 3.

Referring now to FIGS. 1 and 3, a collector 58, of copper or the like, is mounted on and insulated from the mounting flange 34 by means of an insulating spacer 59, of ceramic material, the latter being secured to the copper flange 34 by suitable means such as the screws 61. This collector is used for the direct measurement of ion current flowing into the apparatus as a reference for use in calculating the gain of the electron multiplier.

The outer end of the dynode housing 18 is provided with apparatus for supporting a collector and a collector shield. Referring to FIGS. 1 and 3, this apparatus comprises a flange 62 which serves as an insulator and which may be made of any suitable material, such as ceramic material or the like. The flange 62 supports a collector shield 63, which may be of copper, in which, the collector 64, of beryllium copper or the like, is received with clearance. As indicated in FIGS. 1 and 4, a grid is provided over the open end of the shield 63. The collector 64 is mounted on an insulating flange 65, which may be of plastic, ceramic material, or other desired insulating material. An end flange 12, of copper or the like, overlies the insulating flange 65. As shown, the flanges 12, 65 and 62, and the collector shield 63, are secured to the channel 21 by suitable means such as the screws 66, provided with insulating means such as the collars 67 where required, the screws being threaded into engagement with corresponding threads formed in suitable apertures in the channel 21.

The collector 64 is mounted on the insulating flange 65 by a screw 68, and is provided with an aperture 69 in which an electrical lead may be connected, as by soldering or brazing. The electrical lead, not shown, may be conducted outwardly to one of the external leads 48 through a channel 70 formed in the insulating plate 65, as shown in FIG. 3, and the lead, properly insulated, may be passed by dynode housing 18 in shielded relation thereto by means of a stainless steel tube 71, which is insulated from the collector housing 63 and the dynode housing flange 31 by suitable insulating spacers such as 72.

As shown in FIGS. 1 and 3, the end flange 12 is secured to the insulating flange 65 by suitable means such as the screw 73. The dynode housing 18 is thus seen to comprise a solid and rugged integral unit, firmly mounted to the base flange 3 at one end by means of the flanges 31, 32 and 40 and the stainless steel risers 35, and restrained at its other end by means of the set screw 11 engaging the recess in the end flange 12.

As will appear, an important advantage of the construction is that the dynode housing 18, which must be maintained at the negative potential of the first dynode 19 to prevent severe defocusing of the electrons emitted from this dynode, aids materially in focusing the electrons emitted from the last dynodes. This action counteracts the tendency of the relatively large electron space charge in this region to defocus the multiplying electron beam. To improve the efficiency of the multiplier at the entrance end of the dynode housing, advantage may be taken of the high potential of the housing 18 with respect to the base flange 3 to provide a form of ion lens for focusing the input ion beam on the first dynode 19. Referring to FIGS. 1 and 3, this lens comprises a tubular conductive shield 74 inserted in an oblique aperture in the mounting flange 33 which is directed toward the working surface of the first dynode 19. The shield 74 is mounted on and electrically connected to the flange 33 by means of an integral flange 75 and the screws 76. The entrance end of the shield 74 is inserted through a suitable aperture in the insulating flange 32 and protrudes into a recess 77 formed in the copper flange 34 shaped to provide equal relief around the end of the tubular shield. The floor of the recess 77 is pierced by an aperture 78 aligned with the aperture in the shield 74. Since the flange 34 is maintained at the potential of the base flange 3, which would be ground potential for the system in which the multiplier is used, the apertured flange 34 and the shield 74, which would be at a negative potential, cooperate to form a lens for focusing positively charged ions on the working surface of the first dynode 19.

Referring next to FIG. 4, we have illustrated the manner in which the electron multiplier of our invention may be connected for use in measuring ion current in a high vacuum system. For convenience, although we have shown a unit comprising 20 dynodes in FIGS. 1 and 3, we have shown only 7 dynodes 20 in addition to the first dynode 19 in the apparatus of FIG. 4, both to simplify the drawing and to emphasize the fact that the electron multiplier construction of our invention is well adapted to the manufacture of electron multipliers having any prescribed number of stages. The ion measuring apparatus of our invention is shown to be connected to an evacuated ion source schematically indicated at 80 by means of the tube 1. The electrodes 42 and 44 are shown connected to ground, at the potential of the vacuum housing 6 on the base flange 3. The intermediate electrode 43 is shown connected to the arm of a switch S1, which is provided with one pole connected to ground and a second pole connected to a suitable source of positive voltage B+. With the electrode 43 grounded, the electrodes 42, 43 and 44 simply serve to mechanically confine entering ions to a beam of desired proportions. However, with the positive potential B+ applied to the electrode 43, the flow of ions through the slits may be controlled or cut off for the purpose of separating and rejecting ions which have suffered collisions and lost energy.

The deflector electrode 52 is connected to ground, and the other deflector electrode 53 is connected to the arm of a two position switch S2 which has one pole connected to a suitable negative source of potential B—, and a second pole connected to a positive source of potential B+. With the switch S2 actuated to connect the negative potential B— to the electrode 53, an electrostatic field is developed between the electrodes 52 and 53 which will deflect the ion beam to the collector electrode 58. In the other position of the switch S2, the ion beam is deflected into the shield tube 74. The collector electrode 58 may be connected to one input terminal of a conventional D.C. amplifier 81, the other input terminal being grounded. The output terminals of the amplifier 81 are connected to a suitable current indicator such as a conventional ammeter 82. In this state of the apparatus, the entering ion current may be measured directly, to provide a base value of current for calculation of the gain of the electron multiplier. In the position of the switch S2 shown, the ion beam is focused onto the first dynode 19 by the ion lens comprising the apertured plate 34, at ground, and the shield 74, connected through the housing 18 to a suitable source of negative potential, here shown as a battery B. Progressively more positive potentials are applied to the remaining dynodes 20 by conventional means comprising the resistors R1, R2, R3, R4, R5, R6 and R7 interconnecting the dynodes. As shown, the last dynode 20 is maintained above ground potential by a suitable resistor R8.

The collector electrode 64 is connected to one input terminal of a conventional D.C. amplifier 83 which has its other input terminal grounded. The output terminals of the amplifier 83 are connected across the terminals of a suitable current indicator, here schematically shown as a conventional ammeter 84.

The collector shield 63 is connected to the arm of a three position switch S3 having one pole grounded, one pole connected to a suitable source of positive voltage B+, and one pole connected to a suitable source of negative voltage B—. When connected to ground by the switch S3, the shield serves to prevent leakage currents to the collector from the housing 18, which is at a high potential with respect to the collector. However, the shield 63 may also be used to control the polarity of the output current of the collector. If the shield is made negative with respect to the collector by operation of the switch S3, secondary emission from the collector will be entirely suppressed and the incoming electron current will cause the collector to assume a negative potential with respect to ground. If the switch is actuated to make the shield positive with respect to the collector, secondary emission from the collector will occur and a net flow of electrons from the collector will result, making the collector positive with respect to ground. Since many commercially available D.C. amplifiers will only accept an input which is positive with respect to ground, the ability to control the polarity of the output of the electron multiplier of our invention is highly desirable.

It is believed that the mode of operation of the electron multiplier of our invention will be apparent from the above description. Briefly, however, a typical sequence of operation including testing and calibrating procedures would comprise the following steps. First, with the apparatus connected to a suitable ion source 80 and a vacuum established, the switch S1 might first be actuated to connect B+ to the electrode 43 and thereby suppress the flow of ions through the entrance slit. Under these conditions, the ammeters 82 and 84 should indicate no current flow. Next, the switch S1 may be returned to the position shown in the drawings to ground the electrode 53. Ions can now enter the slit defined by the electrodes 42, 43 and 44, and will be deflected by the field between the deflector electrodes 52 and 53 into collision with the collector 58. A potential will accordingly be applied to the input terminals of the amplifier 81, causing a current to flow through the ammeter 82. The indication of the ammeter 82, suitably modified by a factor determined by the gain of the amplifier 81, may be recorded as an indication of the primary ion current flowing through the slit.

After recording the primary ion current, the switch S2 may be returned to the position shown, and the ion beam will then be focused on the first dynode 19 by the lens comprising the apertured flange 34 and the tubular shield 74. Secondary electrons from the dynode 19 will be attracted to the next dynode 20, and secondary electrons from this dynode will be attracted to the next dynode 20, in the manner known in the art, until lthe multiplied stream of electrons strikes the last dynode 20. Secondary electrons from the last dynode strike the collector 64. With the switch S3 in the position shown, the collector 64 will develop a negative potential, causing the amplifier 83 to produce an output current having a value indicated by the ammeter 84. Taken with the previously recorded indication of the ammeter 82 and the gain of the amplifier 83, the indication of the ammeter 84 may be used to calculate the gain of the electron multiplier. Thereafter, the output current of the amplifier 83 may be related directly to the primary ion current to avoid the necessity for measuring it directly with the collector 58, and the latter may be used only when it is desired to check the performance of the system.

While we have described our invention with reference to the details of a specific embodiment thereof, many changes and variations will be apparent to those skilled in the art upon reading our description, and such may obviously be made without departing from the scope of our invention.

Having thus described our invention, what we claim is:

1. In an electron multiplier, an ordered sequence of dynodes, means for applying a sequence of progressively more positive potentials to said dynodes from a first to a last in the sequence, a collector located adjacent the last dynode in the sequence, a conductive shield surrounding the collector, insulated therefrom, and provided with an aperture exposing the collector to the last dynode, means for focusing a stream of ions on said first dynode, and adjustable means for applying a voltage to said shield selected from a range including positive and negative values.

2. In combination, an ordered sequence of dynodes arranged in an ordered electron multiplying array from a first to a last, a conductive housing for said dynodes comprising a conductive channel member having a transverse mounting flange formed at one end, means for mounting said first dynode in said housing adjacent said flange and electrically connected to said housing, insulating means for mounting the rest of said dynodes in said housing in said arrangement and spaced along said channel in a direction away from said flange, a conductive shield extending through said flange in an aperture therein and provided with a tubular aperture directed toward said first dynode, said shield being electrically connected to said housing, an insulating flange mounted on said mounting flange and provided with an aperture to admit said shield, and a conductive flange mounted on said insulated flange electrically insulated from said mounting flange and provided with an aperture aligned with the tubular aperture in said shield.

3. The combination of claim 2, further comprising a collector electrode, insulating means for mounting said electrode adjacent an end of said channel opposite said mounting flange, exposed to said last dynode and insulated from said housing, and a conductive shield surrounding said electrode, provided with an aperture exposing said electrode to said last dynode, and mounted on and insulated from said housing.

4. In an electron multiplier, a conductive channel member having three sides parallel to a longitudinal axis, a mounting flange normal to said axis secured to said channel member at one end, and an opposite open end, a pair of longitudinal grooves parallel to said axis formed within said channel on the intermediate side, a pair of dynodes in said channel and having concave working surfaces normal to said intermediate side and oriented in an electron multiplying array, said dynodes each having opposed end surfaces normal to said working surfaces, one end surface of each dynode confronting a different one of said grooves, and having a parallel groove formed therein, an insulating rod registering with each groove and separating the dynodes from the channel member, a conductive plate mounted between edges of the remaining sides of said channel, electrically connected thereto, and overlying the said dynodes; a metal stud for each dynode extending through said plate and threaded into the dynode, each stud having a flange confronting the side of the plate facing the channel, an insulating spacer compressed between the flange of each stud and the plate, and a resistor connected between the studs on the side of the plate opposite the dynodes.

5. In apparatus for measuring a current of positive ions, an evacuated ferromagnetic housing provided with an aperture adapted to receive a stream of ions at one end, an electron multiplier within said evacuated housing and comprising a series of dynodes including a first dynode adapted to generate a plurality of electrons in response to an impinging ion beam, an ion lens located in said housing in position to focus a stream of ions entering said housing on said first dynode, a collector electrode mounted within said housing and spaced from said ion lens, a pair of deflector electrodes mounted within said housing on either side of the path of ions entering said housing, and means for applying a voltage across said deflector electrodes to deflect the ion beam from said ion lens to said collector electrode.

6. An electron multiplier, comprising an evacuated ferromagnetic housing, a conductive dynode housing mounted within said ferromagnetic housing and electrically insulated therefrom, an ion lens mounted at one end of said dynode housing, a collector electrode mounted at an opposite end of said dynode housing and electrically insulated therefrom, a first dynode mounted within said dynode housing, electrically connected thereto, and in position to receive a beam of positive ions focused by said lens, a series of dynodes mounted in said dynode housing between said first dynode and said collector electrode in position to receive secondary electrons emitted from said first dynode and propogate successively a multiplied current of secondary electrons to said collector electrode, said dynode housing being shaped to focus said multiplied current toward said collector electrode, and means for applying a series of progressively more positive potentials to said dynodes from said first dynode toward said collector.

7. Apparatus of the class described, comprising an outer ferromagnetic housing provided with an aperture adapted to receive a beam of positively charged particles, an electron multiplier mounted within said housing, insulated therefrom, and comprising a collector electrode and a series of dynodes interconnected by resistors and arrayed in an electron multiplying series between a first dynode in the path of said beam and a last dynode having a working surface confronting said collector electrode, a conductive dynode housing surrounding said dynodes and electrically connected to said first dynode, and means for applying a negative voltage to said first dynode with respect to said last dynode.

8. The apparatus of claim 7, further comprising a conductive shield surrounding said collector electrode, insulated therefrom, and provided with an aperture exposing said electrode to said last dynode, and means for applying a predetermined potential to said shield to control the polarity of said collector electrode.

9. In an electron multiplier, a plurality of dynodes each comprising an elongated block of metal terminated by plane ends normal to its longitudinal axis and having a concave working surface parallel to the longitudinal axis, a metal housing of rectangular cross section enclosing said dynodes and having two sides parallel to the ends of said dynodes, said dynodes being oriented in an electron multiplying array, a terminal of one of said dynodes being electrically connected to said housing and secured to said parallel sides, the remainder of said dynodes being confined between said parallel sides by insulating members, and an electrical terminal connected to each insulated dynode, extending through said housing, and insulated from said housing.

10. In combination, a tubular metal housing having a mounting flange formed at one end and an insulated collector electrode mounted at the other end, a tubular aperture in said flange, a series of dynodes mounted in said housing in an electron multiplying array and including a first dynode electrically connected to said housing and having a working surface confronting said tubular aperture, the series comprising other dynodes insulated from said housing and terminating in a dynode confronting said collector electrode, a conductive plate mounted on said flange and insulated therefrom, said plate being provided with an aperture exposing said tubular aperture, means electrically connecting said plate and said last dynode, means for applying a negative potential to said housing and first dynode with respect to said plate and last dynode and progressively lower potentials to successive dynodes from the first to the last, whereby positively charged particles in the vicinity of the aperture in the plate are focused on the first dynode by the aperture in the plate and the tubular aperture in the flange, and a successively multiplied current of secondary electrons is propagated to said collector electrode by said dynodes and focused on the collector elecetrode by said housing.

11. The apparatus of claim 10, further comprising an insulated conductive shield surrounding said collector electrode, mounted on said housing and provided with an aperture exposing the collector to the last dynode, and means for applying a predetermined potential to the shield for controlling the flow of secondary electrons from the collector electrode.

12. Apparatus for measuring the flow of positively charged particles, comprising an evacuated ferromagnetic housing, a first collector electrode mounted in said housing and insulated therefrom, an electron multiplier comprising a second collector electrode and a series of dynodes interconnected by resistors and arrayed to form an electron multiplier, said series having an input end comprising a first dynode and an output end comprising a last dynode confronting said second collector electrode, a conductive housing surrounding said dynodes and electrically connected to said first dynode, means for applying a negative potential to said first dynode with respect to said last dynode, an ion lens comprising an aperture in said housing for focusing a stream of ion on said first dynode, an aperture in said ferromagnetic housing comprising means defining a slit for admitting a beam of ions to said housing, a pair of deflector electrodes on either side of the beam defined by the slit within the ferromagnetic housing, and means for selectively applying a first or a second potential to said deflector electrodes to direct a beam of ions flowing through said slit to said first collector electrode or said ion lens, respectively.

13. In combination, a conductive, base flange having an entrance aperture adapted to admit a flow of charged particles, a ferromagnetic cylinder having one end sealed to said base flange surrounding said entrance aperture and an opposite end sealed by a ferromagnetic plate, a conductive flange parallel to said base flange and supported within said cylinder on conductive risers secured to said base flange, a focusing aperture through said conductive flange, a first collector electrode, insulating means mounting said collector electrode on said conductive flange facing said base flange and adjacent said focusing aperture, deflector means mounted on said base flange for selectively deflecting a beam of ions entering through said entrance aperture to said first collector electrode or to said focusing aperture, an insulating flange mounted on the side of said conductive flange opposite said base flange, a conductive dynode housing having a mounting flange secured to said insulating flange and a tubular conductive shield electrically connected to said mounting flange and communicating with said focusing aperture, a plurality of dynodes secured within said housing, insulated therefrom, and comprising a first dynode having a working surface in the path of ions flowing through said tubular aperture, said first dynode being electrically connected to said housing, resistors interconnecting said dynodes in a conductive series path with a resistor separating each dynode from the next in the series, a collector electrode located at an end of the dynode housing opposite the mounting flange, insulating means for mounting said collector electrode on the housing, means for applying a negative potential between the first dynode and the last dynode in the series, and insulating means for mechanically connecting said opposite end of the dynode housing to said ferromagnetic plate.

References Cited by the Examiner
UNITED STATES PATENTS

| | | | |
|---|---|---|---|
| 2,418,574 | 4/1947 | Cawein | 250—207 |
| 2,762,928 | 9/1956 | Wiley | 315—105 |

RALPH G. NILSON, *Primary Examiner.*

LEWIS H. MYERS, MAYNARD R. WILBUR,
*Examiners.*

H. S. MILLER, G. E. MATTHEWS, A. L. BIRCH,
*Assistant Examiners.*